(12) United States Patent
Pan et al.

(10) Patent No.: US 11,014,195 B2
(45) Date of Patent: May 25, 2021

(54) STEEL WELDING COMPONENT WITH ALUMINUM OR ALUMINUM ALLOY COATING, AND PREPARATION METHOD THEREFOR

(71) Applicant: BAOSHAN IRON & STEEL CO., LTD., Shanghai (CN)

(72) Inventors: Hua Pan, Shanghai (CN); Yongchao Su, Shanghai (CN); Ming Lei, Shanghai (CN); Lei Shi, Shanghai (CN); Haomin Jiang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 54 days.

(21) Appl. No.: 16/339,215

(22) PCT Filed: Oct. 17, 2017

(86) PCT No.: PCT/CN2017/106516
§ 371 (c)(1),
(2) Date: Apr. 3, 2019

(87) PCT Pub. No.: WO2018/077067
PCT Pub. Date: May 3, 2018

(65) Prior Publication Data
US 2020/0038998 A1    Feb. 6, 2020

(30) Foreign Application Priority Data

Oct. 27, 2016 (CN) .......................... 201610953787.2

(51) Int. Cl.
*B32B 15/01* (2006.01)
*B23K 26/322* (2014.01)
(Continued)

(52) U.S. Cl.
CPC .......... *B23K 26/322* (2013.01); *B23K 26/323* (2015.10); *B32B 15/012* (2013.01);
(Continued)

(58) Field of Classification Search
None
See application file for complete search history.

(56) References Cited

U.S. PATENT DOCUMENTS

| 8,614,008 | B2* | 12/2013 | Canourgues | ........... | B23K 26/32 |
| | | | | | 428/653 |
| 2006/0021975 | A1 | 2/2006 | Ott et al. | | |
| 2014/0003860 | A1* | 1/2014 | Evangelista | ........... | B23K 26/60 |
| | | | | | 403/270 |

FOREIGN PATENT DOCUMENTS

| CA | 2942755 | 10/2015 |
| CN | 101426612 | 5/2009 |
| | (Continued) | |

OTHER PUBLICATIONS

International Search Report dated Jan. 23, 2018 for PCT Patent Application No. PCT/CN2017/106516.

*Primary Examiner* — Daniel J. Schleis
(74) *Attorney, Agent, or Firm* — Thomas Horstemeyer, LLP

(57) ABSTRACT

Provided is a steel welding component having a steel welding blank with an aluminum or aluminum alloy coating. The welding blank is composed of a steel substrate and coatings comprising an intermetallic compound alloy layer contacting the substrate, and a metal alloy layer on the intermetallic compound alloy layer. On at least one of the coating surfaces of the welding blank, the coating within an area to be welded has been totally removed, and an end face of the coating on the side of the coating within the area to be welded removed has an angle of β being 0-80° with a plane vertical to a surface of the substrate which is parallel (Continued)

to the welding seam. Also provided are welding methods for the steel welding component. The steel welding blank provided ensures the tensile strength, elongation, and corrosion resistance of a hot-stamped welded joint.

17 Claims, 2 Drawing Sheets

(51) Int. Cl.

| | |
|---|---|
| *C22C 21/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/28* | (2006.01) |
| *C22C 38/32* | (2006.01) |
| *C23C 2/12* | (2006.01) |
| *B23K 26/323* | (2014.01) |
| *C22C 38/14* | (2006.01) |
| *C22C 38/18* | (2006.01) |
| *B23K 103/04* | (2006.01) |

(52) U.S. Cl.
CPC ............ *C22C 21/02* (2013.01); *C22C 38/002* (2013.01); *C22C 38/02* (2013.01); *C22C 38/04* (2013.01); *C22C 38/06* (2013.01); *C22C 38/14* (2013.01); *C22C 38/18* (2013.01); *C22C 38/28* (2013.01); *C22C 38/32* (2013.01); *C23C 2/12* (2013.01); *B23K 2103/04* (2018.08); *Y10T 428/12757* (2015.01)

(56) References Cited

FOREIGN PATENT DOCUMENTS

| | | |
|---|---|---|
| CN | 102971444 | 3/2013 |
| CN | 104204257 | 12/2014 |

* cited by examiner

STEEL WELDING COMPONENT WITH ALUMINUM OR ALUMINUM ALLOY COATING, AND PREPARATION METHOD THEREFOR

CROSS-REFERENCE TO RELATED APPLICATIONS

This application is a 371 U.S. National Phase of PCT International Application No. PCT/CN2017/106516 filed on Oct. 17, 2017, which claims benefit and priority to Chinese patent application no. 201610953787.2, filed on Oct. 27, 2016. Both of the above-referenced applications are incorporated by reference herein in their entireties.

TECHNICAL FIELD

The present invention relates to the manufacture of welding component, and in particular to a steel welding component with aluminum or aluminum alloy coating, and preparation method therefor.

BACKGROUND ART

In recent years, the thinning of thickness while maintaining high strength, energy saving and emission reduction has been the main development trend of the automotive industry. Hot press is a common way to achieve high product reinforcement, which combines heat treatment and high temperature forming to achieve high strength of the product. Hot press of laser tailor-welded blanks can reduce the number of parts of car body and improve manufacturing precision while reducing weight.

Common laser tailor-welded hot press products include: A-pillar, B-pillar, C-pillar, middle channels and other safety structural parts. These hot-press products have the characteristics of high strength, complex shape, good formability, high size accuracy, small rebound, dissimilar strength, and dissimilar thickness. The surface state of the steel for hot press is divided into bare boards and coated steel sheets depending on the service conditions of the parts. The hot-stamped steel sheet with coating is getting more and more attention because it can eliminate the shot peening after hot press with respect to the bare board. The most commonly used hot forming steels are hot-stamped steel with aluminum or aluminum alloy coating and hot-stamped steel with zinc-based coating. Since zinc-based coatings can cause cracks that extend to the substrate, hot-stamped steel with aluminum or aluminum alloy coating is commonly used so far. However, when steel with aluminum or aluminum alloy coating is welded, the coating is melted into the molten pool by welding heat to form brittle and hard intermetallic compounds ($Fe_3Al$, $Fe_2Al_5$, $FeAl_3$). During the heat treatment after welding, the intermetallic compounds further grow, resulting in significant decreases in the strength and ductility of the welded joint.

The Chinese patent CN101426612A disclosed a method for manufacturing a welding blank which is made of an aluminum-silicon coating as a raw material and only contains intermetallic compounds as a pre-coating. Specifically, the aluminum alloy layer in the coating is removed to prevent excessive aluminum from melting into the molten pool, and the intermetallic compound layer in the coating is retained; then the welded blank is welded and hot stamped. Although the patent removed the alloy layer of the coating, since the intermetallic compound layer is retained (retained thickness is 3~10 μm), elements from coating will still be introduced into the welding seam, resulting in a decrease in welding performance when improperly controlled. In addition, retaining a few micrometers of coating is also very difficult to implement stably, which increases the risk in production.

SUMMARY OF THE INVENTION

An object of the present invention is to provide a steel welding component with aluminum or aluminum alloy coating that ensures tensile strength, elongation and corrosion resistance of the welded joint after hot press, and a method for manufacturing the steel welding component.

In order to achieve the above object, the technical solutions of the present invention are as follows:

a steel welding blank with an aluminum or aluminum alloy coating, which is composed of a steel substrate and coatings; the coating comprises an intermetallic compound alloy layer in contact with the substrate, and a metal alloy layer on the intermetallic compound alloy layer; on at least one of the coating surfaces of the welding blank, the coating within an area to be welded of the welding blank has been totally removed, and an end face of the coating on the side of the coating within the area to be welded removed has an angle of β with a plane vertical to a surface of the substrate which is parallel to the welding seam, wherein β=0-80°, preferably β is 5~60°.

Preferably, the area to be welded of the welding blank where the coating has been removed has a width of 0.4 mm to 1.2 mm; preferably 0.5 mm to 1.0 mm or 0.6 mm to 0.8 mm.

Preferably, the substrate of the welding blank comprises the following components in weight percentage: C: 0.08-0.8%, Si: 0.05-1.0%, Mn: 0.1-5%, P<0.3%, S<0.1%, Al<0.3%, Ti<0.5%, B: 0.0005-0.1%, Cr: 0.01-3%, the balance being Fe and unavoidable impurities.

Preferably, the substrate of the welding blank comprises the following components in weight percentage: C: 0.1-0.6%, Si: 0.07-0.7%, Mn: 0.3-4%, P<0.2%, S<0.08%, Al<0.2%, Ti<0.4%, B: 0.0005-0.08%, Cr: 0.01-2%, the balance being Fe and unavoidable impurities.

Preferably, the substrate of the welding blank comprises the following components in weight percentage: C: 0.15-0.5%, Si: 0.1-0.5%, Mn: 0.5-3%, P<0.1%, S<0.05%, Al: <0.1%, Ti: <0.2%, B: 0.0005-0.08%, Cr: 0.01-1%, the balance being Fe and unavoidable impurities.

Preferably, the coating of the welding blank is made of pure aluminum or an aluminum alloy.

Preferably, the substrate of the welding blank has a thickness of 0.5 mm to 3 mm.

The steel welding component with aluminum or aluminum alloy coating of the present invention is obtained wherein the steel welding blank with an aluminum or aluminum alloy coating is tailor-welded by welding in the area to be welded of the welding blank where the coating has been completely removed.

In the method for manufacturing a steel welding component with aluminum or aluminum alloy of the present invention, the steel welding blank with an aluminum or aluminum alloy coating is tailor-welded by welding in the area to be welded of the steel welding blank where the coating has been completely removed to form a welded joint; a part is obtained by hot press, wherein the coating is completely converted into intermetallic compounds during the hot press process to provide corrosion protection and decarburization protection for the steel substrate; after austenitizing, in view of the actual desired mechanical properties of the part, a cooling rate greater than a critical speed of martensite transformation by quenching in the substrate is selected for cooling.

Preferably, the welding is a laser welding, preferably a laser welding with filler wire.

Preferably, on at least one of the coating surfaces of the steel welding blank, the coating within the area to be welded is removed by laser ablation.

Preferably, on at least one of the coating surfaces of the steel welding blank, the coating within the area to be welded is removed by mechanical exfoliation.

Before welding the steel welding blank of the present invention, on at least one of the coating surfaces of the steel welding blank, the coating within an area to be welded has been totally removed, and an end face of the coating on the side of the coating removed has an angle of β with a plane vertical to a surface of the substrate which is parallel to the welding seam.

The angle β makes it possible to form a section of thickness gradient at the edge where the coating is removed. Although the section is narrow, it is possible to effectively prevent the coating metal from melting into the molten pool or accumulating in the welding heat affected zone due to welding thermal circulation.

As described above, the present invention ensures that the coating metal does not melt into the molten pool by the design of the width and the angle of the completely removed coating, so that the problems in the prior art, such as forming brittle and hard intermetallic compounds ($Fe_3Al$, $Fe_2Al_5$, $FeAl_3$) due to coating metal melting into the molten pool, is solved, and the problem of reduction in strength and ductility of a welded joint due to growth of intermetallic compounds during heat treatment after welding, also is solved.

DETAILED DESCRIPTION

In order to make the above objects, features and advantages of the present invention more apparent, the specific embodiments of the present invention will be described in detail below with reference to the accompanying drawings. It should be noted that the present invention is not limited to the specific embodiments below. The present invention will be understood by those skilled in the art from the spirit indicated in the following embodiments. The technical terms of the present application may be understood broadly based on the spirit of the invention.

Figure 1:
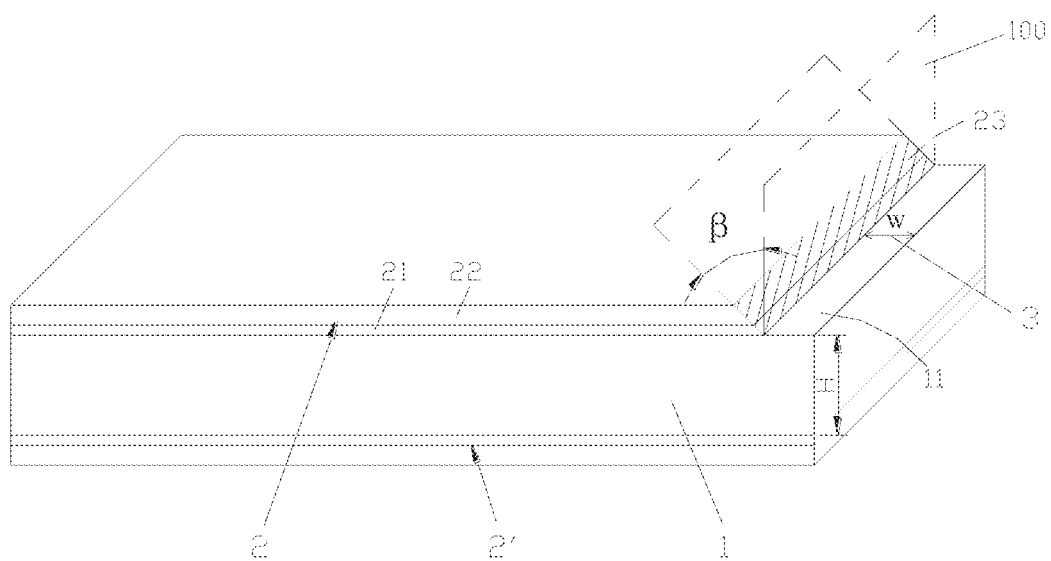
FIG. 1 is a schematic view of the steel welding blank with an aluminum or aluminum alloy coating of the present invention after the coating within an area to be welded of the steel welding blank has been totally removed.

As shown in FIG. 1, the steel welding blank with an aluminum or aluminum alloy coating of the present invention is composed of a steel substrate 1 and coatings 2, 2'; the coating 2 (taking coating 2 as an example, the same below) comprises an intermetallic compound alloy layer 21 in contact with the substrate 1, and a metal alloy layer 22 on the intermetallic compound alloy layer 21; on at least one of the coating surfaces of the steel welding blank, the coating 2 within an area 3 to be welded of the welding blank has been totally removed, and an end face 23 of the coating 2 of the welding blank on the side of the coating within the area 3 to be welded removed has an angle of β with a plane 100 vertical to a surface 11 of the substrate 1 which is parallel to the welding seam, wherein β is 0-80°, preferably β=5~60°.

The removal effect of coating 2 can be verified by photomicrography off-line monitoring. The effect of the deplating operation can also be quickly verified by an online optical inspection. The metal alloy layer 22 or the intermetallic compound layer 21 of the coating and the substrate 1 have a significant difference in reflectance to light. Therefore, the deplating operation can be monitored by measuring the reflectance or emissivity by a spectrometer. Specifically, the area where the coating has been removed is illuminated by a light source and directed by an optical sensor; the measured value corresponds to the reflected energy; the values are then compared to the reference values of the reflectivity or emissivity of the alloy layer 22 and the intermetallic compound layer 21 of the coating and the substrate 1 to monitor whether the depth of the deplating operation is up to standard.

The width W of the area 3 to be welded of the welding blank where the coating has been removed is 0.4 mm to 1.2 mm; preferably 0.5 mm to 1.0 mm or 0.6 mm to 0.8 mm.

Preferably, the coating 2 of the welding blank is made of pure aluminum or aluminum alloy. Preferably, the substrate 1 of the welding blank has a thickness H of 0.5 mm to 3 mm.

Example 1

Figure 2:
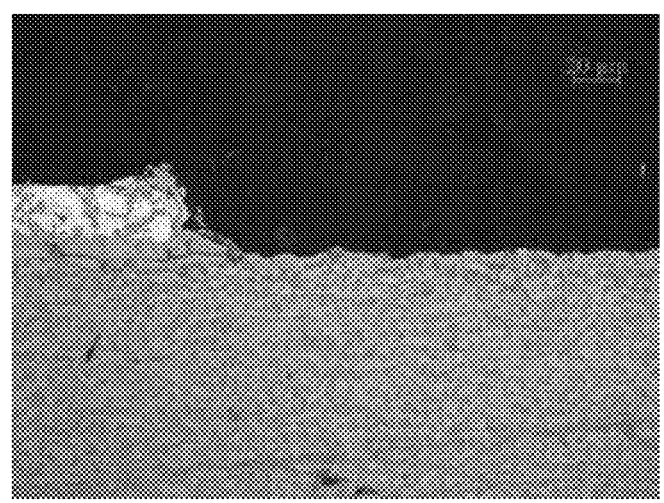
FIG. 2 is a metallographic view of the area to be welded in the steel welding blank of the present invention after completely deplating with a laser beam.

The 1.2 mm steel sheet with an aluminum alloy coating was laser-blanked into a blank of 240 mm×110 mm, wherein the composition of the hot dipping solution was: Si: 8.5%, Fe: 2.6%, and the balance was Al and intrinsic impurities. Prior to laser tailor-welding, four different methods for preparing welding blanks were used:

Method 1 (according to the present invention): Aluminium-silicon coating having a width of 0.6 mm was removed from both sides of the 240 mm length of the blank by laser ablation. β=45°. A short pulse, high average power laser with a rated power of 850 W, a pulse width of 30 ns and a pulse frequency of 23 kHz was used, and the moving speed of the light spot relative to the steel sheet was 8 m/min. FIG. 2 shows the surface state of the steel sheet after completly deplating.

Figure 3:
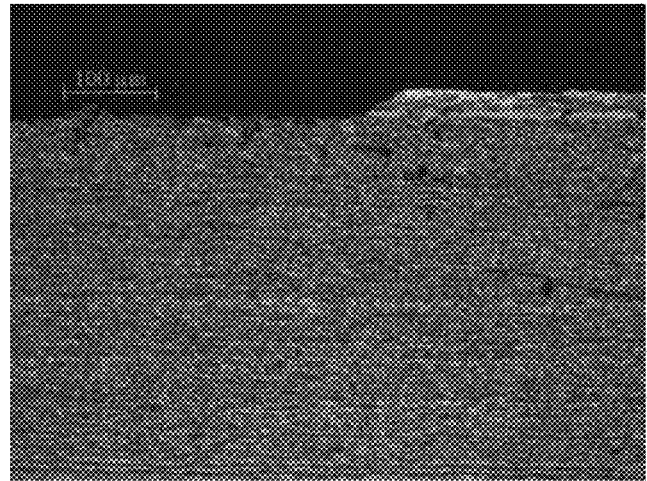
FIG. 3 is a metallographic view of the area to be welded in the steel welding blank of the present invention after completely deplating with machinery.
Figure 4:
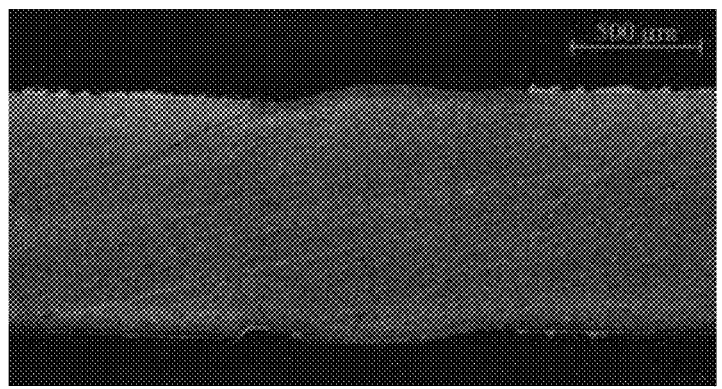
FIG. 4 is a metallographic view of the laser tailor-welded joint after hot press of the present invention.

Method 2 (according to the present invention): Aluminium-silicon coating having a width of 0.8 mm was removed from both sides of the 240 mm length of the blank by using precision scraping equipment. β=45°. FIG. 3 shows the edge of the steel sheet after the coating is removed by this method.

Method 3 (did not according to the present invention): Aluminum alloy layer in the coating having a width of 0.6 mm was removed from both sides of the 240 mm length of the blank by laser ablation, while the intermetallic compound layer was retained.

Method 4 (did not according to the present invention): Laser tailor-welding is performed directly on the edge to be welded, without any treatment.

According to the welding process described below, the above blanks were laser tailor-welded. The welding power is 4 kW, the welding speed is 11.75 m/min, the reserved gap of the splice plate is 0 mm, the defocusing amount is 0 mm, and the welded joint after welding has an uncoated-metal region having a width of about 1.0 mm.

Then, the tailor-welded blank was hot-stamped and quenched at a heating temperature of 930° C., a heating time of 3 minutes, and a pressure holding time of 10 seconds in a water-passing mold. After the above thermal cycle, the tailor-welded blank was completely austenitized. During heating, the atoms in the coating interdiffused with the atoms in the steel, transforming all of the original coating into an intermetallic compound layer havig a thickness greater than that of the original coating. In addition, the intermetallic compound layer has a high melting point and high hardness, preventing the substrate from being oxidized and decarburized during the heating stage and the pressure holding stage. During the pressure holding in the mold, the tailor-welded blank underwent martensite transformation, and finally a welded component having a tensile strength greater than 1450 MPa was obtained.

Then, the performances of the welded joint were evaluated according to Table 1.

TABLE 1

| Method | Brittle intermetallic compounds inside the welded joint* | Tensile strength of the joint (MPa)** | Elongation of the joint (%)** | Corrosion resistance of the joint*** |
|---|---|---|---|---|
| 1 | None | >1450 | >4% | Qualified |
| 2 | None | >1450 | >4% | Qualified |
| 3 | None | >1450 | ≥4% | Qualified |
| 4 | Present | 1054 | ≤1% | Unqualified |

*Electron microscopic analysis of the cross section of the welding seam perpendicular to the welding surface to determine the presence of intermetallic compounds;
**The tensile strength and elongation of the joint were tested using a standard tensile specimen with a nominal width of 12.5 mm and an original gauge length of 50 mm;
***Corrosion resistance test was carried out according to DIN50021, DIN50017, DIN50014.

Example 2

The 1.2 mm steel sheet with an aluminum alloy coating was laser-blanked into a blank of 240 mm×110 mm, wherein the composition of the hot dipping solution was: Si: 8.5%, Fe: 2.6%, and the balance was Al and intrinsic impurities.

Prior to laser tailor-welding, the following method (according to the present invention) was used to remove the coating: Aluminium-silicon coating having a width of 0.6 mm was removed from both sides of the 240 mm length of the blank by laser ablation. A short pulse, high average power laser with a rated power of 850 W, a pulse width of 30 ns and a pulse frequency of 23 kHz was used, and the moving speed of the light spot relative to the steel sheet was 8 m/min. A total of 5 sets of sample blanks were prepared. It should be noted, however, that the β angle of each set of blanks (according to the present invention) is different, as shown in Table 2.

Then, the performances of the welded joint were evaluated according to Table 2.

TABLE 2

| Set No. | β angle | Tensile strength of the joint (MPa)* | Elongation of the joint (%)* | Corrosion resistance of the joint** |
|---|---|---|---|---|
| 1 | 5 | 1532 | 5.9 | Qualified |
| 2 | 15 | 1523 | 5.7 | Qualified |
| 3 | 30 | 1507 | 5.3 | Qualified |
| 4 | 45 | 1489 | 4.7 | Qualified |
| 5 | 60 | 1456 | 4.2 | Qualified |

*The tensile strength and elongation of the joint were tested using a standard tensile specimen with a nominal width of 12.5 mm and an original gauge length of 50 mm;
**Corrosion resistance test was carried out according to DIN50021, DIN50017, DIN50014.

The invention claimed is:

1. A steel welding blank with an aluminum or aluminum alloy coating, which is composed of a steel substrate and coatings; the coating comprising an intermetallic compound alloy layer in contact with the substrate, and a metal alloy layer on the intermetallic compound alloy layer; wherein, on at least one of coating surfaces of the welding blank, the coating within an area to be welded of the welding blank has been totally removed, and an end face of the coating on the side of the coating within the area to be welded removed has an angle of β with a plane vertical to a surface of the substrate which is parallel to a welding seam, wherein β is 5~60°; and wherein the area to be welded of the welding blank where the coating has been removed has a width of 0.4 mm to 1.2 mm.

2. The steel welding blank with an aluminum or aluminum alloy coating according to claim 1, wherein the substrate of the welding blank has a thickness of 0.5 mm to 3 mm.

3. The steel welding blank with an aluminum or aluminum alloy coating according to claim 1, wherein the substrate of the welding blank comprises the following components in weight percentage: C: 0.08-0.8%, Si: 0.05-1.0%, Mn: 0.1-5%, P<0.3%, S<0.1%, Al<0.3%, Ti<0.5%, B: 0.0005-0.1%, Cr: 0.01-3%, the balance being Fe and unavoidable impurities.

4. The steel welding blank with an aluminum or aluminum alloy coating according to claim 1, wherein the coating of the welding blank is made of pure aluminum or aluminum alloy.

5. A steel welding component with an aluminum or aluminum alloy coating, wherein the steel welding blank with an aluminum or aluminum alloy coating according to claim 1 is tailor-welded by welding in the area to be welded of the welding blank where the coating has been completely removed.

6. The steel welding blank with an aluminum or aluminum alloy coating according to claim 1, wherein the area to be welded of the welding blank where the coating has been removed has a width of 0.5 mm to 1.0 mm.

7. The steel welding blank with an aluminum or aluminum alloy coating according to claim 3, wherein the substrate of the welding blank comprises the following components in weight percentage: C: 0.1-0.6%, Si: 0.07-0.7%, Mn: 0.3-4%, P<0.2%, S<0.08%, Al<0.2%, Ti<0.4%, B: 0.0005-0.08%, Cr: 0.01-2%, the balance being Fe and unavoidable impurities.

8. The steel welding blank with an aluminum or aluminum alloy coating according to claim 7, wherein the substrate of the welding blank comprises the following components in weight percentage: C: 0.15-0.5%, Si: 0.1-0.5%, Mn: 0.5-3%, P<0.1%, S<0.05%, Al<0.1%, Ti<0.2%, B: 0.0005-0.08%, Cr: 0.01-1%, the balance being Fe and unavoidable impurities.

9. The steel welding blank with an aluminum or aluminum alloy coating according to claim 2, wherein the substrate of the welding blank comprises the following components in weight percentage: C: 0.08-0.8%, Si: 0.05-1.0%, Mn: 0.1-5%, P<0.3%, S<0.1%, Al<0.3%, Ti<0.5%, B: 0.0005-0.1%, Cr: 0.01-3%, the balance being Fe and unavoidable impurities.

10. A steel welding component with an aluminum or aluminum alloy coating, wherein the steel welding blank with an aluminum or aluminum alloy coating according to claim 2 is tailor-welded by welding in the area to be welded of the welding blank where the coating has been completely removed.

11. The steel welding blank with an aluminum or aluminum alloy coating according to claim 6, wherein the area to be welded of the welding blank where the coating has been removed has a width of 0.6 mm to 0.8 mm.

12. The steel welding blank with an aluminum or aluminum alloy coating according to claim 9, wherein the substrate of the welding blank comprises the following components in weight percentage: C: 0.1-0.6%, Si: 0.07-0.7%, Mn: 0.3-4%, P<0.2%, S<0.08%, Al<0.2%, Ti<0.4%, B: 0.0005-0.08%, Cr: 0.01-2%, the balance being Fe and unavoidable impurities.

13. The steel welding blank with an aluminum or aluminum alloy coating according to claim 12, wherein the substrate of the welding blank comprises the following components in weight percentage: C: 0.15-0.5%, Si: 0.1-0.5%, Mn: 0.5-3%, P<0.1%, S<0.05%, Al<0.1%, Ti<0.2%, B: 0.0005-0.08%, Cr: 0.01-1%, the balance being Fe and unavoidable impurities.

14. A method for manufacturing a steel welding component with an aluminum or aluminum alloy coating, wherein the steel welding blank with an aluminum or aluminum alloy coating according to claim 1 is tailor-welded by welding in the area to be welded of the steel welding blank where the coating has been completely removed to form a welded joint; and obtaining a part by hot press, wherein a cooling rate greater than a critical speed of martensite transformation by quenching in the substrate is selected for cooling.

15. The method for manufacturing a steel welding component with an aluminum or aluminum alloy coating according to claim 14, wherein on at least one of the coating surfaces of the welding blank, the coating within the area to be welded of the welding blank is removed by laser ablation.

16. The method for manufacturing a steel welding component with an aluminum or aluminum alloy coating according to claim 14, wherein on at least one of the coating surfaces of the steel welding blank, the coating within the area to be welded of the steel welding blank is removed by mechanical exfoliation.

17. The method for manufacturing a steel welding component with aluminum or aluminum alloy coating according to claim 14, wherein the welding is a laser welding, preferably a laser welding with filler wire.

* * * * *